United States Patent [19]

Rito et al.

[11] Patent Number: 4,745,257
[45] Date of Patent: May 17, 1988

[54] LASER WELDING METHOD

[75] Inventors: Naotake Rito; Masao Ohta; Tsugio Yamada; Junichi Gotoh; Tsutomu Kitagawa, all of Hyogo, Japan

[73] Assignee: Mitsubishi Denki Kabushiki Kaisha, Tokyo, Japan

[21] Appl. No.: 38,445

[22] Filed: Apr. 14, 1987

Related U.S. Application Data

[63] Continuation of Ser. No. 666,417, Oct. 30, 1984, abandoned.

[30] Foreign Application Priority Data

Apr. 2, 1984 [JP] Japan .................................. 59-66905

[51] Int. Cl.⁴ ............................................. B23K 26/00
[52] U.S. Cl. ........................ 219/121 LD; 219/121 LC; 219/121 LM
[58] Field of Search ................. 219/121 LH, 121 LM, 219/121 LC, 121 LD, 121 PY, 137 R, 121 EC, 121 ED, 121 EM

[56] References Cited

U.S. PATENT DOCUMENTS

| | | | |
|---|---|---|---|
| 3,881,084 | 4/1975 | Baardsen | 219/121 LD |
| 3,969,604 | 7/1976 | Baardsen | 219/121 LD |
| 4,386,728 | 7/1983 | Torok et al. | 219/121 ED |

FOREIGN PATENT DOCUMENTS

| | | | |
|---|---|---|---|
| 2929267 | 6/1980 | Fed. Rep. of Germany . | |
| 56-66396 | 6/1981 | Japan . | |
| 58-47590 | 3/1983 | Japan . | |
| 0593757 | 12/1977 | Switzerland | 219/121 LD |
| 2035872 | 6/1980 | United Kingdom . | |

*Primary Examiner*—M. H. Paschall
*Attorney, Agent, or Firm*—Sughrue, Mion, Zinn, Macpeak & Seas

[57] ABSTRACT

A laser welding method and apparatus for welding stacked coated members in which voids in the welds are positively eliminated. A spacer is disposed between the two members to be welded. This provides a path for discharging gas formed by heating the coating material. The method and apparatus of the invention are useful for the laser welding of base members coated with metals having a lower melting point than the metal of the base, paints and oils. Preferably, the width of the gap is in a range of 0.1 mm to 0.5 mm.

4 Claims, 1 Drawing Sheet

LASER WELDING METHOD

This is a continuation of application Ser. No. 666,417 filed Oct. 30, 1984 now abandoned.

BACKGROUND OF THE INVENTION

The present invention relates to a laser welding method for welding materials with a laser beam and to an apparatus for practicing this method. More particularly, the invention relates to a laser welding method in which a plurality of materials to be welded are stacked one on another and welded together and to an apparatus for practicing the method.

A laser welding apparatus of this type is disclosed in Japanese Laid-Open Patent Application No. 47590/1983. In that apparatus, upper and lower rollers are arranged in such a manner that materials to be welded which have been stacked together are held thereby, and the upper roller presses the materials to be welded while being rotated. The welding operation is carried out by applying a laser beam to the materials to be welded, which are moved horizontally while being held between the upper and lower rollers.

In the conventional welding machine constructed as described above, in the case where materials to be welded are coated members formed by plating or coating base plates such as steel plates with zinc or tin, or more specifically, when the materials to be welded are zinc-plated steel plates as shown in FIG. 1, when the zinc-plated steel plates 1 and 2 are rendered molten by a laser beam 3, the zinc deposits 4 through 7 becomes zinc vapor 8 instantaneously because the melting point of the zinc deposits 4 through 7 is much lower than that of the steel base. In this case, as the zinc-plated steel plates 1 and 2 are forced into close contact with each other, the zinc vapor 8 is forced to jet into a hole 9 formed by molten metal 10, thus blowing the molten metal. As a result, the hole 9 become irregular in configuration. Thus, during the welding operation, the molten metal cannot completely fill the hole 9, and therefore many voids 12 are liable to be formed in the solidified metal 11. This is a disadvantage of the conventional welding machine.

SUMMARY OF THE INVENTION

The present invention is intended to eliminate the above-described difficulties accompanying a conventional welding machine.

In accordance with this and other objects, the invention provides a laser welding method in which materials to be welded are held in such a manner as to have a suitable air gap therebetween through which the vapor of a covering material such as zinc is released, whereby the resultant weld is excellent, having no defects such as air holes.

DESCRIPTION OF THE PREFERRED EMBODIMENTS

Figure 1:
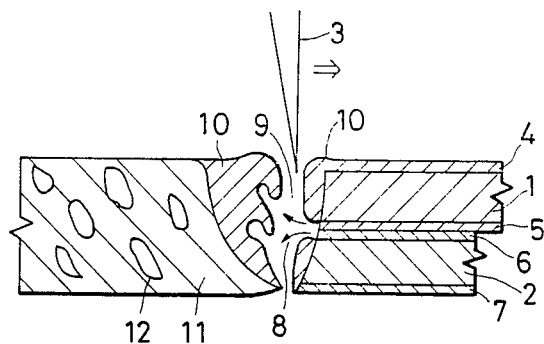
FIG. 1 is an explanatory diagram used for a description of a conventional laser welding method.
Figure 2:
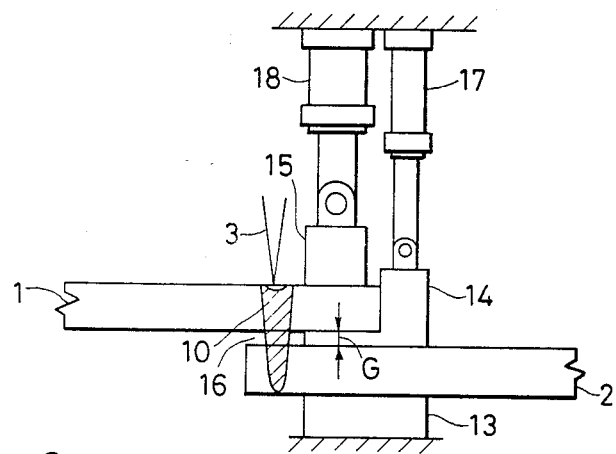
FIG. 2 is an explanatory diagram showing the arrangement of a welding apparatus constructed in accordance with a preferred embodiment of the invention.

A preferred embodiment of the invention will now be described. As shown in FIG. 2, a material to be welded, namely, a zinc-plated steel plate 2, is placed on a welding table 13 and a spacer 14 having a thickness G is placed on the steel plate 2. Another zinc-plated steel plate 1 is placed on the spacer 14. Under this condition, the steel plates and the spacer are pressed by a clamper 15, as a result of which a predetermined uniform air gap is formed between the confronting surfaces of the overlapping parts of the zinc-plated steel plates 1 and 2 due to the presence of the spacer 14. The spacer 14 and the clamper 15 are connected to driving cylinders 17 and 18, respectively, so as to be moved vertically.

Figure 3:
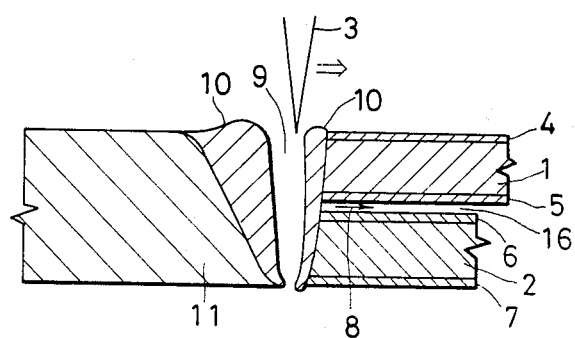
FIG. 3 is an explanatory diagram used for a description of a laser welding method practiced with the welding apparatus in FIG. 2.

With the predetermined air gap 16 formed between the overlapping parts of the zinc-plated steel plates 1 and 2 as described above, the welding operation is carried out by applying a laser beam 3 to the steel plates as indicated in FIG. 3. In this case, the zinc vapor 8 of the zinc deposits 4 and 5 can flow into the air gap 16, and therefore the configuration of the hole 9 formed by molten metal 10 is maintained satisfactory. Accordingly, as the welding point is moved, the hole 9 is completely filled with the molten metal 10. Therefore, no air holes are formed in the solidified metal 11. Thus, the resultant weld is satisfactory in quality.

An example of the results of a welding operation carried out according to the above-described embodiment will be described. The welding operation was carried out by applying a $CO_2$ laser to materials as indicated in Table 1. The number of air holes (12) formed in the welds were counted using an X-ray photographing technique. The results of the inspection are as indicated in Table 2. As is apparent from Table 2, no air holes were formed when the thickness of the spacer was 0.1 mm to 0.5 mm.

TABLE 1

| | Thickness | Material of the base plate | Quantity of zinc deposit |
| --- | --- | --- | --- |
| Zinc-plated steel plate 1 | $t_1 = 0.8$ | SPCC | Zinc deposit 3: 20 g/m² Zinc deposit 4: 20 g/m² |
| Zinc-plated steel plate 2 | $t_2 = 1$ mm | SPCC | Zinc deposit 5: 3 g/m² Zinc deposit 6: 3 g/m² |

TABLE 2

| Method | Thickness of spacer (14) | Number of air holes (12) per weld line 1 m |
| --- | --- | --- |
| Method of the invention | 0.05 mm | 0 to 2 |
| | 0.1 mm | 0 |
| | 0.2 mm | 0 |
| | 0.3 mm | 0 |
| | 0.4 mm | 0 |
| | 0.5 mm | 0 |
| Conventional method | 0 (close contact) | Very numerous |

In the above-described embodiment, zinc-plated steel plates are employed as the materials to be welded. However, the same effect can be obtained with tin-plated steel plates or the like the metal coatings of which have lower melting points than the base materials. In addition, the same effect can be obtained with materials which are coated with a paint which is gasified by the welding heat.

In the above-described embodiment, the materials to be welded are two zinc-plated steel-plates. However, the same effect can be obtained in the case also where more than two materials to be welded are laid one on another.

Furthermore, in the described embodiment, the materials to be welded are covered with metal. However, it should be noted that the same effect can be obtained with materials which are not covered with metal or with materials which are coated by oil or the like which is gasified by the welding heat.

In the described embodiment, a spacer is used to provide the air gap between the materials to be welded. However, the same effect can be obtained by other methods.

As is apparent from the above description, in accordance with the invention, laser welding is carried out with an air gap provided between overlapping parts of materials to be welded. The resultant weld has an excellent quality, having no defects such as air holes.

We claim:

1. A laser welding method comprising the following steps:
   covering materials to be welded with coating material having a lower melting point than the base metal thereof;
   stacking said materials to be welded one on top of another while positioning a spacer therebetween to provide a continuous predetermined air gap in the joints therebetween; and
   applying a laser beam to said materials to be welded to lap weld the latter, said continuous predetermined air gap forming a path for discharge of gas formed by heating said coating material during application of said laser beam.

2. The laser welding method as claimed in claim 1, wherein said coating material is a paint.

3. The laser welding method as claimed in claim 1, wherein said coating material is an oil.

4. The laser welding method as claimed in claim 1, wherein said air gap between said materials to be welded has a width in a range of 0.1 mm to 0.5 mm.

* * * * *